US006227430B1

(12) United States Patent
Rosen et al.

(10) Patent No.: US 6,227,430 B1
(45) Date of Patent: May 8, 2001

(54) FSW TOOL DESIGN FOR THICK WELD JOINTS

(75) Inventors: Charles D. Rosen, Huntington Beach; Edward Litwinski, Mission Viejo; Juan M. Valdez, Southgate, all of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/070,551

(22) Filed: Apr. 30, 1998

(51) Int. Cl.[7] .......................... B23K 20/12; B29C 65/06; F16B 35/00
(52) U.S. Cl. ....................... 228/2.1; 228/112.1; 156/73.5; 411/412
(58) Field of Search .................... 228/112.1, 2.1, 228/114; 156/580, 73.5; 411/412, 413, 424, 426

(56) References Cited

U.S. PATENT DOCUMENTS

| | | | | |
|---|---|---|---|---|
| 310,229 | * | 1/1885 | Seely | 411/413 |
| 4,018,132 | * | 4/1977 | Abe | 411/413 |
| 4,144,110 | * | 3/1979 | Luc | 156/73.5 |
| 4,534,690 | * | 8/1985 | Barth | 411/386 |
| 4,907,989 | * | 3/1990 | Huska | 439/812 |
| 4,959,241 | | 9/1990 | Thomas et al. . | |
| 5,098,237 | * | 3/1992 | Harker | 411/21 |
| 5,262,123 | | 11/1993 | Thomas et al. . | |
| 5,460,317 | | 10/1995 | Thomas et al. . | |

(List continued on next page.)

FOREIGN PATENT DOCUMENTS

| | | | |
|---|---|---|---|
| 2 306 366 | * 5/1997 | (GB) | 228/112.1 |
| WO 93/10935 | 6/1993 | (WO) . | |
| WO 95/26254 | 10/1995 | (WO) . | |

OTHER PUBLICATIONS

TWI Bulletin, "Friction stir—where we are, and where we're going . . . ", Thomas, Dawes, Gittos, Andrews, May/Jun. 1998.*

Rockwell Science Center, "Friction Stir Welding", Deinken, Jul. 20, 1999.*

Kaiser Aluminum & Chemical Corporation, Metals Research, Henry Yang, "Hot Friction Stir Welding of Aluminum Alloys", Jan. 10, 1998.*

(List continued on next page.)

*Primary Examiner*—Patrick Ryan
*Assistant Examiner*—Kiley Stoner
(74) *Attorney, Agent, or Firm*—Christensen O'Connor Johnson Kindness PLLC

(57) ABSTRACT

The present invention provides a novel pin design for a friction stir welding (FSW) tool that can penetrate more deeply into workpieces to form a thicker weld joint without overloading the tool. The pin is provided with threads on its surface. Some portions of the threads are in a positive hand (d2, d3); positive threads screw in to draw the pin into workpieces when the pin is rotated. Other portions of the threads are in a negative hand (d1, d4); negative threads screw out to oppose drawing-in of the pin. When the pin is rotated and driven into workpieces under an applied vertical load, the positive threads encourage penetration of the pin into the workpieces while the negative threads enhance shearing of workpiece material into particles. The positive threads thus reduce the amount of vertical load required to drive the pin, and therefore allow the pin to penetrate more deeply into workpieces to form a thicker weld joint without overloading the tool. Preferably, the pin diameter is decreased from its proximal end (d1) to its distal end (d4), either discretely in steps or linearly in a tapering manner. The reducing profile of the pin further eases penetration of the pin into workpieces, and also reduces the amount of transverse welding load required to traverse the pin along the weld interface.

6 Claims, 2 Drawing Sheets

U.S. PATENT DOCUMENTS

| | | |
|---|---|---|
| 5,469,617 | 11/1995 | Thomas et al. . |
| 5,624,067 | 4/1997 | Harwig et al. . |
| 5,718,366 * | 2/1998 | Colligan ............................ 228/112.1 |
| 6,029,879 * | 2/2000 | Cocks .................................... 228/2.1 |
| 6,053,391 * | 4/2000 | Heideman et al. ................... 228/2.1 |

OTHER PUBLICATIONS

Thomas, W.M., et al., "Emergent Friction Joining Technologies for the Non–ferrous Casting Industry," TWI, BCIRA International Conference, 1996, pp. 30–1 through 30–12.

* cited by examiner

FSW TOOL DESIGN FOR THICK WELD JOINTS

FIELD OF THE INVENTION

This invention relates to friction stir welding, and more particularly, to friction stir welding tool designs and a method for forming thick friction stir weld joints.

BACKGROUND OF THE INVENTION

Friction stir welding (FSW) is a relatively new welding process for joining together parts of materials such as metals, plastics, and other materials that will soften and commingle under applied frictional heat to become integrally connected. A detailed description of the FSW apparatus and process may be found in Patent Publications WO 93/10935 and WO 95/26254; and U.S. Pat. No. 5,460,317, all of which are hereby fully incorporated by reference. One of the useful apparatus for FSW is shown in FIGS. 1A and 1B. As shown, two parts, exemplified by plates 10A' and 10B', are aligned so that the edges of the plates to be welded together are held in direct contact on a backing plate 12'. An FSW tool W has a shoulder 14' at its distal end, and a nonconsumable welding pin 16' extending downward centrally from the shoulder. As the rotating tool W' is brought into contact with the interface between plates 10B' and 10A', the rotating pin 16' is forced into contact with the material of both plates, as shown. The rotation of the pin in the material and rubbing of the shoulder against the upper surface of the material produce a large amount of frictional heating of both the welding tool and the plate interface. This heat softens the material of the plates in the vicinity of the rotating pin and shoulder, causing commingling of material which, upon hardening, forms a weld. The tool is moved longitudinally along the interface between plates 10A' and 10B', thereby forming an elongate weld along the interface between the plates. The welding tool's shoulder 14' prevents softened material from the plates from escaping upward, and forces the material into the weld joint. When the weld is completed, the welding tool is retracted.

Nonconsumable welding pin 16' can have a threaded surface. When a pin with a threaded surface is used, the pin is typically rotated in a negative direction, i.e., in a screwing-out direction, to enhance shearing of workpiece material into particles. This occurs because a threaded pin rotated in a positive direction, i.e., in a screwing-in direction, tends not to generate enough frictional heat to form a satisfactory FSW. A pin rotated in a negative direction, however, encounters greater resistance than a pin without threads or a pin rotated in a screwing-in direction, and thus requires a greater vertical load to drive the pin into workpieces. As the thickness of the workpieces that are welded together increases, the thickness of the weld joint increases. In order to form thicker weld joints, the FSW pin must penetrate more deeply into the workpieces, and a vertical load applied to drive the pin must be increased accordingly. There is a limit, however, to the amount of vertical load that can be applied to the FSW tool, and thus a limit to the depth the pin can be driven into workpieces. A need exists for a friction stir welding tool design that is suitable for penetrating farther into workpieces to form a thicker weld joint without overloading the tool.

SUMMARY OF THE INVENTION

The present invention provides a novel pin design for a friction stir welding (FSW) tool that enables the pin to penetrate more deeply into workpieces that require such penetration to form satisfactory weld joints. The design of the pin includes features that cooperate with the rotation of the pin to complement the vertical load, and encourage penetration of the pin into the workpieces. A pin formed in accordance with the present invention includes threads on its surface that are of a positive hand, termed "positive threads". The term "positive threads" means threads provided on a pin that screw in to draw the pin into workpieces when the pin is rotated. Conversely, the term "negative threads" means threads on a pin that screw out to oppose drawing-in of the pin when the pin is rotated.

One embodiment of the pin design includes negative threads at its distal and proximal ends, and positive threads between the ends. As the pin is rotated and plunged into workpieces, the negative threads on the pin enhance shearing of workpiece material into particles, while the positive threads on the same pin encourage penetration of the pin into the workpieces. Another embodiment of the pin design includes a combination of positive threads and flat surfaces. In both embodiments, the positive threads complement the vertical load required to drive the pin into workpieces. Accordingly, the pin design of the present invention allows the pin to penetrate more deeply into workpieces to form a thicker weld joint without overloading the welding tool.

Preferably, the pin diameter is decreased from its proximal end to its distal end, either discretely in steps or linearly in a tapering manner, to further ease penetration of the pin. The decrease in diameter further reduces the amount of transverse welding load required to traverse the pin along the workpieces interface to form an elongate weld.

The invention also provides a method of forming thicker friction stir weld joints by reducing the amount of vertical welding load required to drive a welding pin more deeply into workpieces. The method includes providing a FSW tool pin having positive threads and either negative threads or flat surfaces, and rotating and driving the pin into workpieces while the positive threads cooperate with the rotation of the pin to complement the vertical load required to drive the pin.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1A:
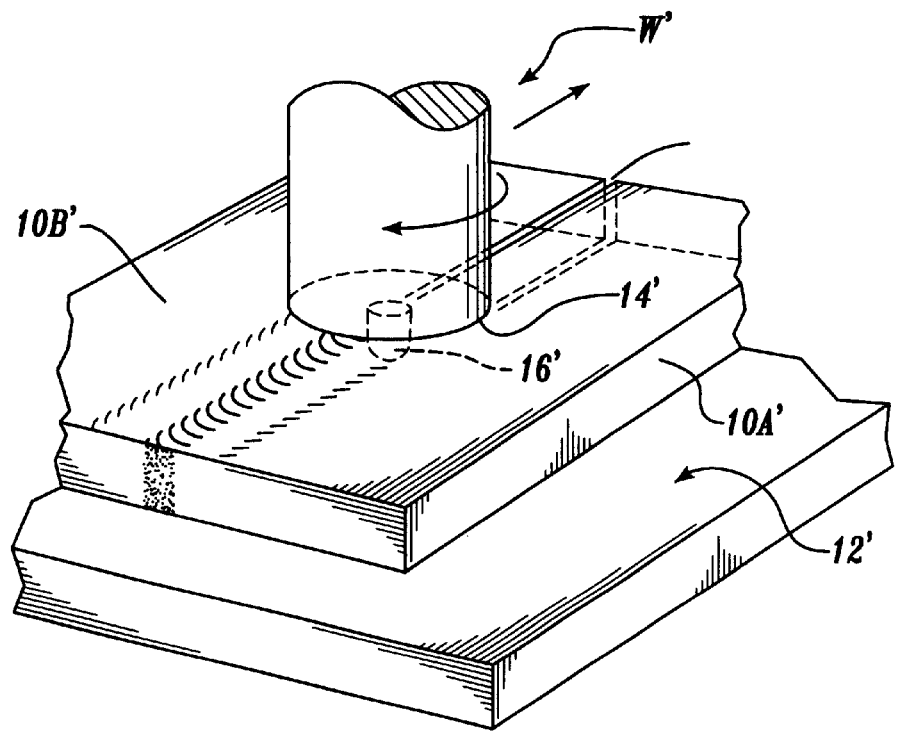
FIG. 1A is a schematic diagram of a prior art friction stir welding apparatus.
Figure 1B:
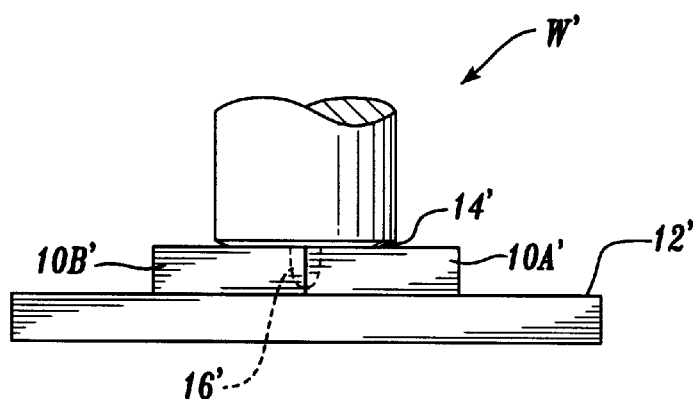
FIG. 1B is a schematic end view showing a prior art friction stir welding tool in use.
Figure 2:
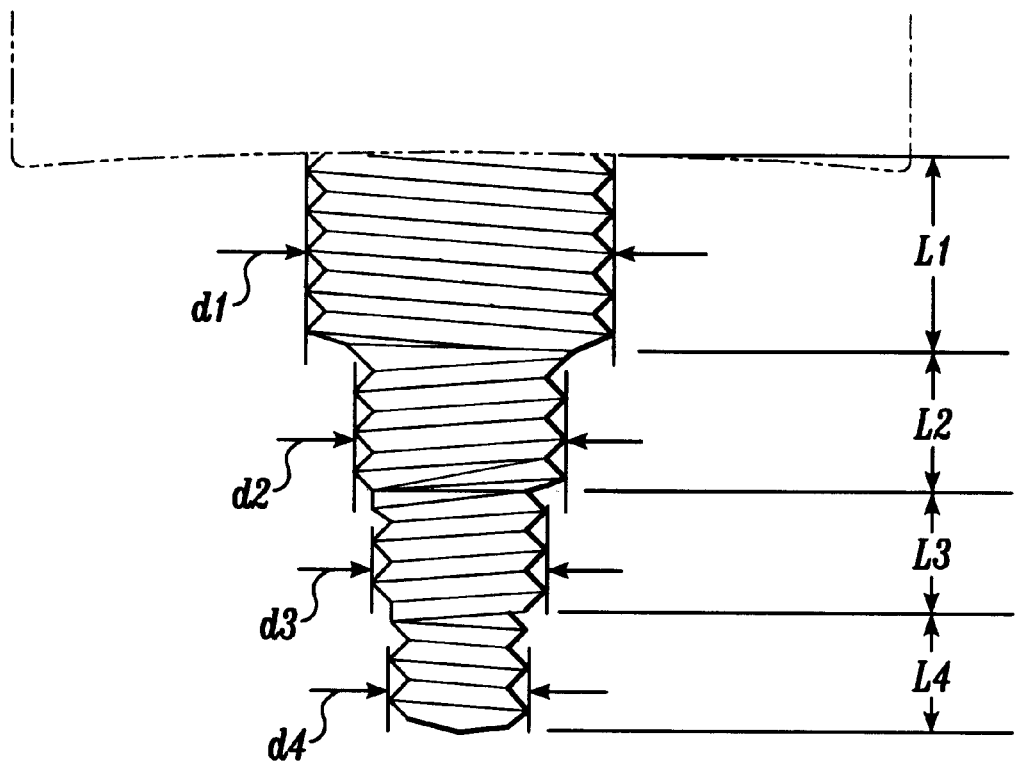
FIG. 2 illustrates a friction stir welding tool pin design for making a thick weld joint according to one embodiment of the present invention.

FIG. 2 illustrates one embodiment of a friction stir welding (FSW) pin that is designed to weld a 1.25 inch thick joint in aluminum workpieces according to the present invention. While the following description describes the present invention in reference to FIG. 2, it should be understood that the invention can be easily adapted to weld joints of various other materials and thicknesses.

In FIG. 2, a FSW pin has four sections with axial lengths L1 through L4, respectively. The axial length of each section is to be determined based on a desired thickness and width of the joint to be formed. For example, in the embodiment designed to form a 1.25 inch thick joint as illustrated in FIG. 2, lengths L1 through L4 are configured to be 0.50 inch, 0.375 inch, 0.250 inch, and 0.125 inch, respectively. In FIG. 2, the threads on the sections with axial lengths L2 and L3 are reversed, or positive, as compared to the negative threads provided on the sections with axial lengths L1 and L4. As before, the term "positive threads" means threads provided on a pin that screw in to draw the pin into workpieces when the pin is rotated, and the term "negative threads" means threads on a pin that screw out to oppose drawing-in of the pin when the pin is rotated.

Still referring to FIG. 2, when the FSW pin is rotated and plunged into workpieces, the negative threads provided at the pin's distal and proximal ends enhance shearing of the workpiece material into particles. The crushed particles are then plasticized by frictional heat generated in the vicinity of the shoulder and the pin of the FSW tool. As discussed above, however, the negative threads on the pin encounter great resistance when the pin is driven into the workpieces, and thus require a relatively large vertical load to drive the pin. The positive threads provided in the middle of the pin, on the other hand, encourage penetration of the pin into the workpieces and thus help reduce the vertical welding load required to drive the pin. Accordingly, the invention effectively allows the pin to penetrate more deeply into workpieces without overloading the welding tool.

It should be understood that the combination of negative threads and positive threads is not limited to that illustrated in FIG. 2, and various other combinations are possible according to a desired thickness of a weld joint. An optimal combination for a specific configuration of a weld joint can be arrived at by combining the smallest thread diameters that can reliably form the weld without breakage. The premise is that smaller diameters result in lower welding loads. Also, the pitch of each thread is to be determined based on the relative location of each thread. While, in FIG. 2, negative threads are provided at both distal and proximal ends of the pin, the present invention is not limited to this specific arrangement. Furthermore, the positive threads of the present invention may be combined not with negative threads but with flat surfaces provided on the pin, and still achieve the same advantage of complementing the vertical load required to drive the pin. For example, the negative threads provided on the distal and proximal ends of the pin in FIG. 2 may be replaced with flat surfaces.

In further reference to FIG. 2, the FSW pin has its diameter decreasing from the proximal end of the pin to the distal end of the pin. The pin diameter decreases by discrete steps, the largest diameter represented by d1 through the smallest diameter represented by d4. The decreasing diameter, and thus a reducing profile of the pin, allows easy penetration of the pin into workpieces by reducing the resistance against the pin, and further reduces the amount of transverse welding load required to traverse the pin along the weld interface. The number of discrete steps can be varied according to a desired thickness of the joint Further, the advantage of the reducing profile can also be achieved by decreasing the pin diameter linearly in a tapering manner. The reducing profile of the pin, however, causes narrowing of a plasticized region near the distal end of the pin during the welding process. An optimal manner of how the pin diameter is decreased is to be determined based on all the considerations as heretofore discussed.

The design of the present invention reduces the amount of vertical load required to drive the pin, and allows the pin to penetrate more deeply into workpieces to form a thicker weld joint. The design, especially when configured in a reducing profile as discussed above, does not rely solely on the force applied on the FSW tool head to drive the pin. It therefore reduces the strain on a milling machine to drive the tool, and also reduces tooling requirements. When the pin has a reducing profile, the overall pin area in contact with workpiece material is smaller, further lessening the requirements for rotating and traversing the pin.

The invention also provides a method of forming a friction stir weld while reducing the amount of vertical welding load required to drive a welding pin into workpieces. The method includes providing a friction stir welding tool pin having positive threads as defined above. The method rotates and drives the pin into workpieces under an applied load. The positive threads provided on the pin encourage penetration of the pin into the workpieces to complement the vertical load required to drive the pin. Accordingly, the method allows a friction stir welding pin to penetrate more deeply into workpieces to form a thicker weld without overloading the tool.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A friction stir welding tool pin adapted to rotate between workpieces to weld the workpieces together, a first portion of the welding contact surface of the pin being provided with positive threads and a second portion of the surface being provided with negative threads, the first and second portions being alternately provided along an axis of the pin to include at least two second portions.

2. The pin of claim 1, wherein the second portion is provided at a distal end of the pin.

3. The pin of claim 1, wherein the second portion is provided at a proximal end of the pin.

4. The pin of claim 1, wherein the pin diameter decreases from a proximal end of the pin to a distal end of the pin.

5. The pin of claim 4, wherein the pin diameter decreases by discrete steps.

6. The pin of claim 4, wherein the pin diameter decreases linearly.

\* \* \* \* \*